US 6,725,291 B2

(12) United States Patent
Lai et al.

(10) Patent No.: US 6,725,291 B2
(45) Date of Patent: Apr. 20, 2004

(54) DETECTION METHOD USED IN ADAPTOR CAPABLE OF INSERTING VARIOUS KINDS OF MEMORY CARDS

(75) Inventors: Chen Nan Lai, Hsinchu (TW); Chanson Lin, Hsinchu (TW); Tsair-Jinn Cheng, Hsinchu (TW)

(73) Assignee: Key Technology Corporation, Hsinchu (TW)

( * ) Notice: Subject to any disclaimer, the term of this patent is extended or adjusted under 35 U.S.C. 154(b) by 136 days.

(21) Appl. No.: 10/050,124

(22) Filed: Jan. 18, 2002

(65) Prior Publication Data

US 2003/0140186 A1 Jul. 24, 2003

(51) Int. Cl.⁷ .................. G06F 13/00; G06F 13/10; G06F 13/12; G06F 3/06
(52) U.S. Cl. .............. 710/16; 710/2; 710/11; 710/13; 710/14; 710/15; 710/62; 710/63; 710/64; 710/72; 710/73; 710/74; 710/300; 710/301; 710/302
(58) Field of Search ............ 710/2, 8, 11, 13–18, 710/62–64, 72–74, 300–304, 313

(56) References Cited

U.S. PATENT DOCUMENTS

| | | | | |
|---|---|---|---|---|
| 5,034,596 A | * | 7/1991 | Utsunomiya | 235/380 |
| 5,296,692 A | * | 3/1994 | Shino | 235/486 |
| 5,349,649 A | * | 9/1994 | Iijima | 709/228 |
| 5,414,835 A | * | 5/1995 | Iijima | 710/1 |
| 5,530,887 A | * | 6/1996 | Harper et al. | 710/104 |
| 5,581,708 A | * | 12/1996 | Iijima | 710/11 |
| 5,651,116 A | * | 7/1997 | Le Roux | 710/11 |
| 5,678,029 A | * | 10/1997 | Iijima | 710/65 |
| 5,748,915 A | * | 5/1998 | Iijima | 710/105 |
| 5,799,171 A | * | 8/1998 | Kondou | 703/27 |
| 5,935,228 A | * | 8/1999 | Shinomura | 710/302 |
| 5,959,276 A | * | 9/1999 | Iijima | 235/380 |
| 6,026,007 A | * | 2/2000 | Jigour et al. | 365/51 |
| 6,182,204 B1 | * | 1/2001 | Nakashima | 712/38 |
| 6,360,952 B1 | * | 3/2002 | Kimlinger et al. | 235/492 |
| 6,438,638 B1 | * | 8/2002 | Jones et al. | 710/301 |
| 6,470,284 B1 | * | 10/2002 | Oh et al. | 702/64 |
| 6,523,073 B1 | * | 2/2003 | Kammer et al. | 710/48 |
| 6,557,754 B2 | * | 5/2003 | Gray et al. | 235/375 |
| 6,578,768 B1 | * | 6/2003 | Binder et al. | 235/492 |
| 6,633,931 B2 | * | 10/2003 | Leung | 710/62 |
| 2002/0004863 A1 | * | 1/2002 | Kazo | 710/62 |
| 2002/0065001 A1 | * | 5/2002 | Sun | 439/630 |
| 2002/0178307 A1 | * | 11/2002 | Pua et al. | 710/62 |
| 2003/0038177 A1 | * | 2/2003 | Morrow | 235/441 |
| 2003/0082961 A1 | * | 5/2003 | Mowery et al. | 439/894 |
| 2003/0084220 A1 | * | 5/2003 | Jones et al. | 710/301 |
| 2003/0095386 A1 | * | 5/2003 | Le et al. | 361/737 |
| 2003/0172263 A1 | * | 9/2003 | Liu | 713/156 |

* cited by examiner

Primary Examiner—Jeffrey Gaffin
Assistant Examiner—Tanh Q. Nguyen
(74) Attorney, Agent, or Firm—Rosenberg, Klein & Lee

(57) ABSTRACT

The present invention relates to a detection method used in a memory card adaptor and, more particularly, to a detection method used in an adaptor capable of inserting various kinds of memory cards. The present invention comprises mainly the steps of: a control device on an adaptor issuing an identification command to detect a memory card responsive to the identification command, and the control device issuing again a reset command to detect a reset-type memory card if there is no corresponding response; the control device continually awaiting a response signal if there is still no corresponding response; the control device entering a read/write mode corresponding to the memory card if a corresponding response is obtained after issuing the command; and the control device awaiting a read/write command of said master device. The present invention can effectively enhance detection and identification efficiency without the need of adding a hardware switching device.

14 Claims, 3 Drawing Sheets

DETECTION METHOD USED IN ADAPTOR CAPABLE OF INSERTING VARIOUS KINDS OF MEMORY CARDS

FIELD OF THE INVENTION

The present invention relates to a detection method used in a memory card adaptor and, more particularly, to a detection method used in an adaptor capable of inserting various kinds of memory cards. The detection method of the present invention mainly utilizes differences of response times, signals, and characteristics of various kinds of memory cards to various types of commands to make appropriate arrangements of detection order, thereby achieving the most efficient detection effect.

BACKGROUND OF THE INVENTION

Recently, due to fast development of electronic-related industry, continual progress of semiconductor process, enhanced requirement of compact electronic products, and considerable research of various kinds of digital applications such as PDA, electronic dictionary, digital camera, digital camcorder, MP3 walkman, and information appliance, many storage systems capable of storing application software and graph and text data have been much appreciated. Commercially available storage systems, no matter hard disk drives or floppy disk drives, utilize magnetic material as the main medium. The access speed of data thereof will be reduced due to influence of mechanism control of the accurate read/write head, and data stored in the storage systems may easily be damaged because of external factors such temperature, humidity, and vibration, resulting in much trouble of the user.

In order to avoid the above drawbacks, various kinds of memory cards mainly using flash memory have been developed, which can apply to wider ranges of temperature and humidity, and will not be affected by vibration. Moreover, they have the advantages of quiet access of data and power saving. However, the individually developed memory cards have no consistent specification so that various kinds of products using memory cards have different specifications. The user thus needs to extra purchase peripheral equipments because of incompatible memory cards when he wants to buy different types of products.

Therefore, adaptors capable of inserting different memory cards have been developed for integrated usage of different types of memory cards. However, because of different number and positions of data I/O pins of various types of memory cards, the read/write modes thereof differ. A switching device of types of memory cards is thus required in the adaptor. R. O. C. Pat. No. 0,389,353 discloses an adapting memory card structure using SSFDC card to access data via CompactFlash card interface, wherein a 50-pin interface of CompactFlash card is used as a basic architecture, and a cassette slot is disposed at the bottom of the adapting memory card so that a solid state floppy disk card can be inserted thereinto. A terminal board comprising a plurality of terminals is disposed inside the adapting memory card. The terminal board can contact metallic conducting sheets of a memory card to read/write data of the memory card. Switching of different read/write modes of the two types of memory cards is achieved by using a switching device composed of a plurality of metallic conducting sheets. As shown in FIG. 1, a flash memory 18 and a controller 16 are disposed on a circuit board (not shown). A memory card 12 is inserted from outside. Basically, the controller 16 is connected with the two types of memory cards. The conducted path is selected by switching power source. When the memory card is not inserted, the power source of the controller 16 is connected with that of the flash memory 18. At this time, the flash memory 18 is used as a standard CompactFlash card. When the memory card 12 is inserted, the housing of the memory card 12 compresses metallic conducting sheets of a switch 14 to let the conductive state of the controller 16 with the flash memory 18 switches to the conductive state of the controller 16 with the memory card 12, hence facilitating access of data on the memory card.

However, the above structure of adaptor can only apply to switching between two fixed types of memory cards, and a mechanical switching device is needed. If an adaptor capable of using various kinds of memory cards is required, the structure of the switching device will be very complex, and the switching of read/write modes between different types of memory cards will be much difficult. The volume of the whole adaptor thus will increase inevitably, resulting in much inconvenience in use.

Accordingly, the present invention aims to propose a detection method of memory card without using a mechanical switching device so that the type of a memory card can be effectively and accurately detected, the detection effect can be enhanced, and the whole space can be saved.

SUMMARY OF THE INVENTION

The primary object of the present invention is to provide a detection method used in an adaptor capable of inserting various kinds of memory cards, wherein a control device on the adaptor is utilized to issue various types of commands, and await or receive response from memory cards to detect various types of memory cards.

The secondary object of the present invention is to provide a detection method of an adaptor capable of inserting various kinds of memory cards, wherein the control device thereof arranges in turn the detection order according to different response times of various types of memory cards to various kinds of commands, thereby enhancing the detection efficiency.

Another object of the present invention is to provide a detection method of an adaptor capable of inserting various kinds of memory cards, wherein the control device thereof can be used to issue various types of commands to identify the types of memory cards according to responsive information of memory cards.

The various objects and advantages of the present invention will be more readily understood from the following detailed description when read in conjunction with the appended drawing, in which:

DETAILED DESCRIPTION OF THE PREFERRED EMBODIMENTS

Figure 1:
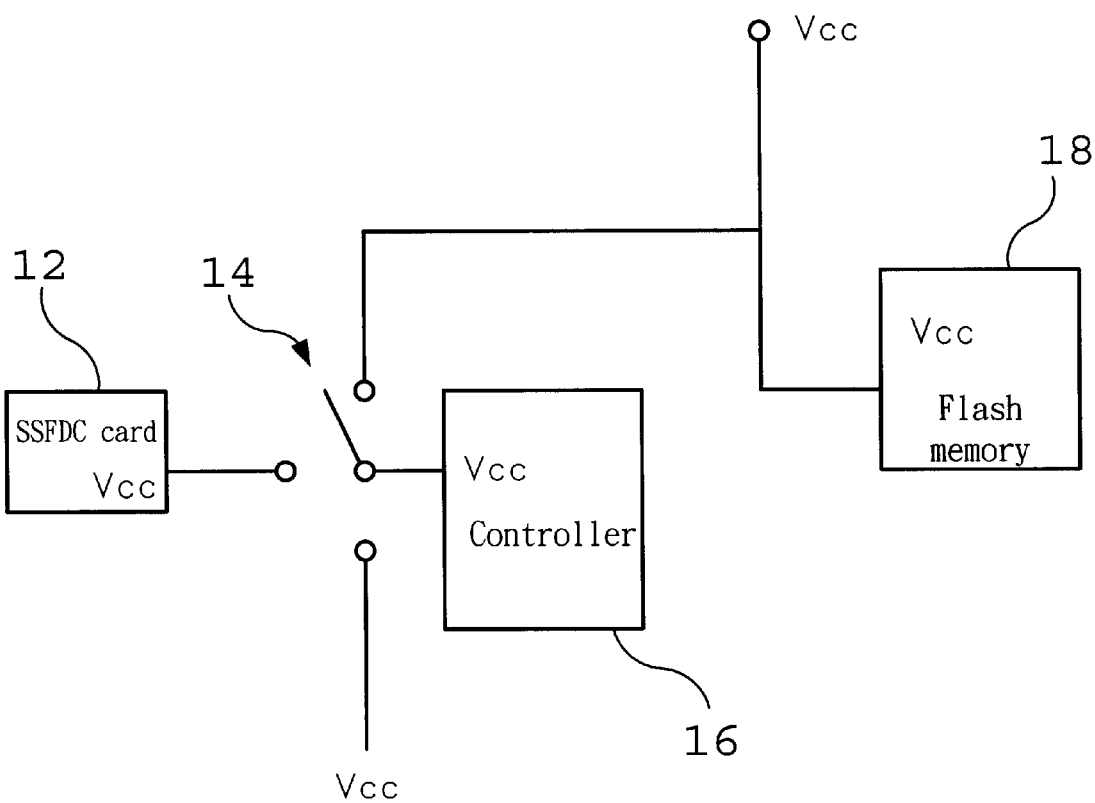
FIG. 1 is a diagram of a dual-purpose switching device of memory card in the prior art.
Figure 2:
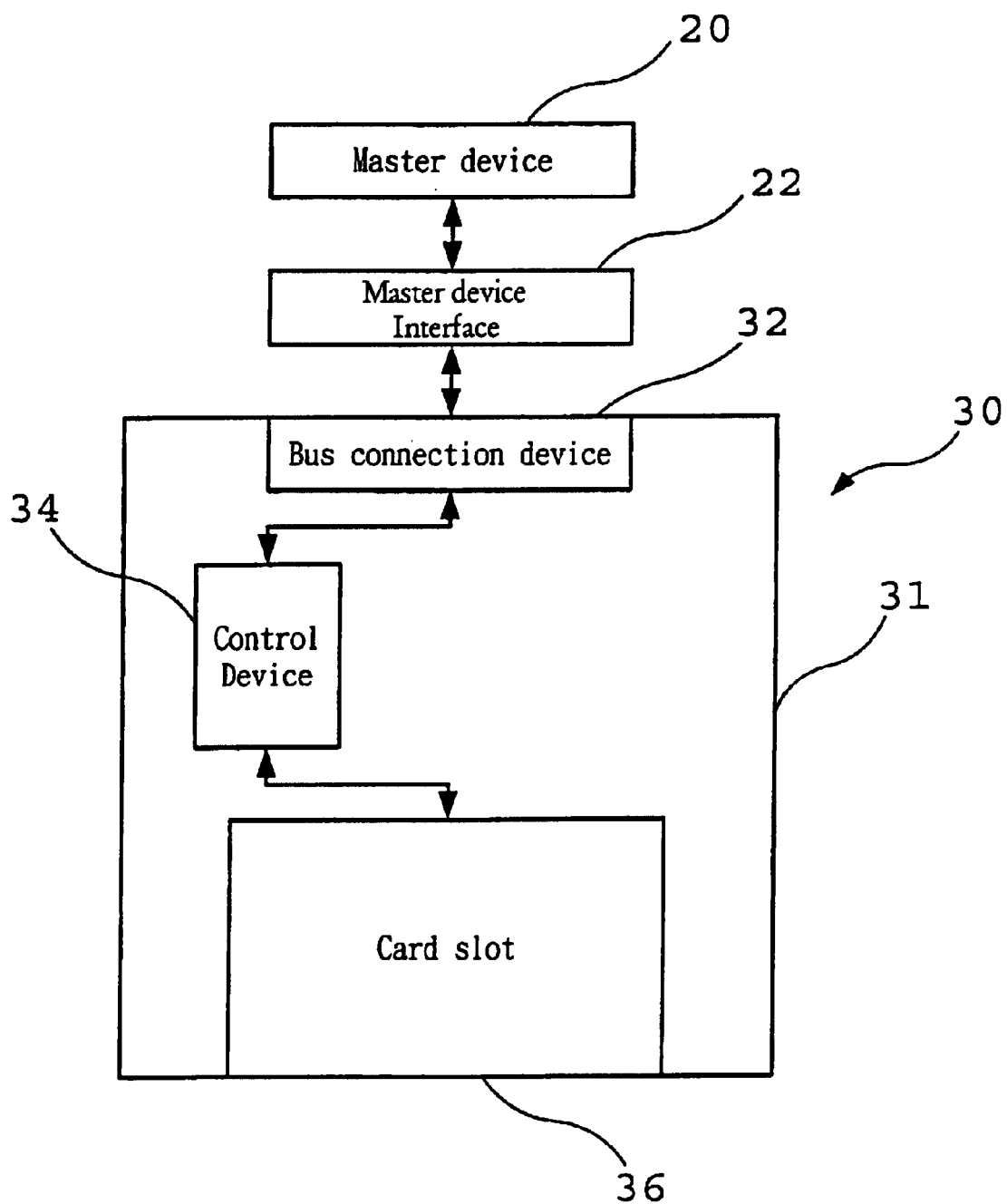
FIG. 2 is a structure block diagram of a memory card adaptor according to a preferred embodiment of the present invention.

As shown in FIG. 2, a memory card adaptor 30 comprises mainly a housing 31 used to receive and fix each component of the adaptor. A bus connection device 32 capable of connecting an interface bus 22 of a master device 20 is disposed at one side of the housing 31. At least a card slot 36 is disposed on the housing 31 for insertion of various kinds of memory cards. A plurality of terminals (not shown) are disposed in the card slot 36 to connect data I/O terminals (not shown) of each memory card. Additionally, a control device is provided to be electrically connected with the card slot 36 and the bus connection device 32. The control device 34 can be used to issue various types of commands, and await or receive response of a memory card in the card slot 36 for identification.

Figure 3:
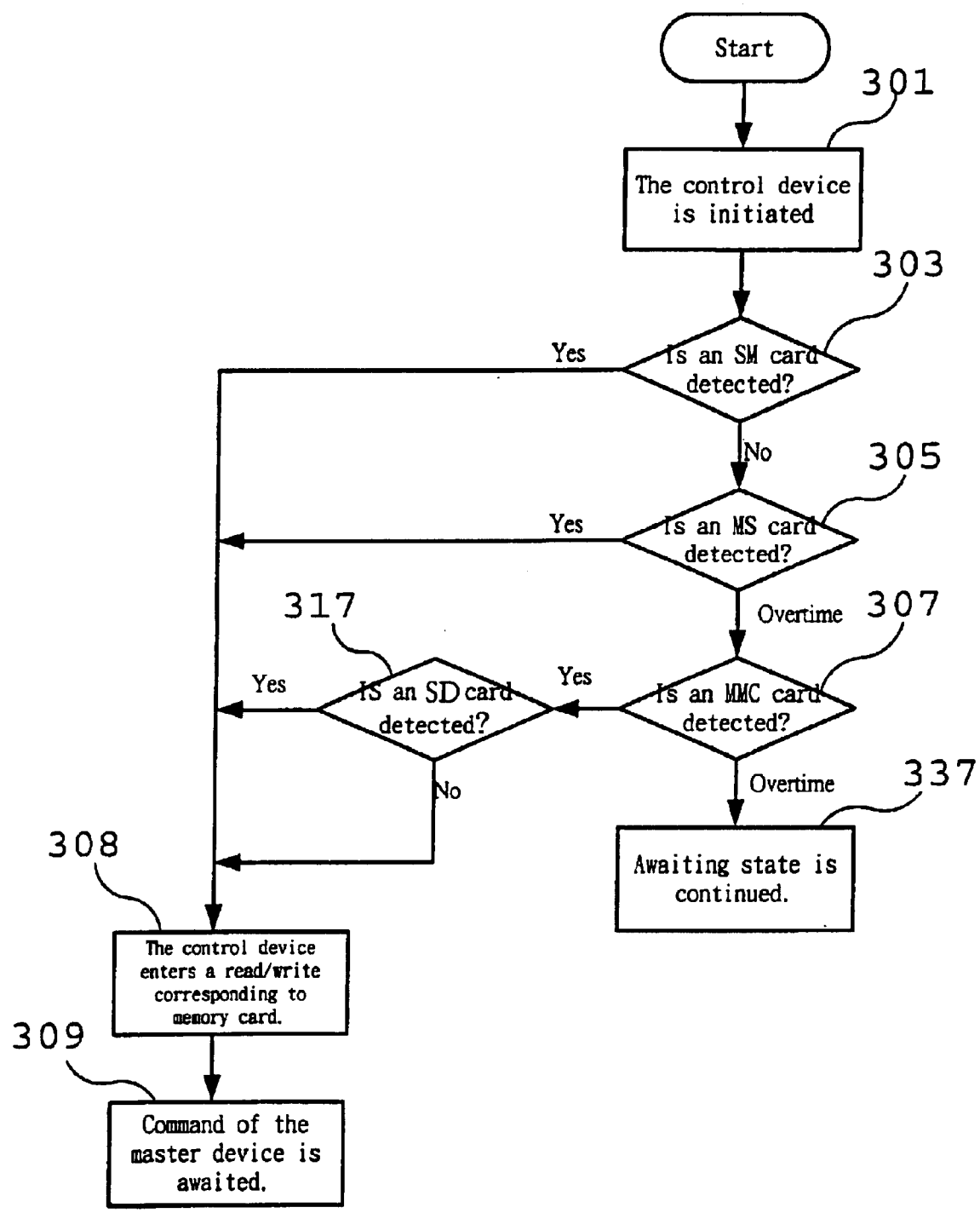
FIG. 3 is a flowchart of a detection method of the present invention.

As shown in FIG. 3, the detection method of the present invention comprises the following steps.

Step 301: The control device 34 of the memory card adaptor 30 performs initiation actions when the master device 20 is turned on.

Step 303: The control device 34 first issues an ID command to detect whether a SmartMedia (SM) card is inserted. If the control device 34 receives a corresponding response that an SM card is inserted, Step 308 is performed. If the control device 34 does not receive a corresponding response or the response is incorrect (e.g., there is no SM card inserted), Step 305 is performed.

Step 305: The control device 34 issues a reset command of first type to detect whether a MemoryStick (MS) card is inserted. If the control device 34 receives a corresponding response that the action of reset has been finished (e.g., an MS card is inserted), Step 308 is performed. If the control device 34 does not receive a corresponding response that the action of reset has been finished within a predetermined time (e.g., there is no MS card inserted), Step 307 is performed.

Step 307: The control device 34 issue a reset command of second type to detect whether a MultiMedia card (MMC) is inserted. If the control device 34 does not receive a corresponding response that the action of reset has been finished within a predetermined time (e.g., there is no MMC card inserted), the control device 34 enters a sustained awaiting state (Step 337). If the control device 34 receives a corresponding response that the action of reset has been finished (e.g., a memory card supporting MMC mode is inserted), Step 317 is performed.

Step 317: After the control device 34 detects there is a memory card supporting MMC mode inserted, it issues again another reset command to detect whether the memory card is a SecureDigital (SD) card. If a corresponding response is received, the memory card is an SD card; otherwise, the memory card is an MMC card, and Step 308 is performed.

Step 308: After the control device 34 receives a response from the memory card, it has identified the type of the memory card. Therefore, the control device 34 can enter a read/write mode corresponding to the memory card, and Step 309 is then performed.

Step 309: Because the detection and identification of a memory card have been finished, and the control device has entered a read/write mode corresponding to the memory card, the control device and the memory card can thus await read/write commands of the master device.

Because the present invention uses memory cards responsive to ID commands such as SM cards, the response speed is fastest and the response time is shortest. The SM card is thus arranged as the first detection subject. Because reset-type memory cards have slower response speed, the detection thereof is arranged after the detection of responsive memory cards. Different reset-type memory cards have different response speeds of reset, and have different responses, the types thereof can thus be identified according to responses thereof. Commercially available reset-type memory cards can be arranged as MS cards and MMC cards according to response time from shortest to longest.

Moreover, because SD cards are improved products of MMC cards, they also support MMC card mode. Therefore, after a memory card is detected to support MMC card mode, it can be further detected whether it supports SD card mode. The detection order can be properly arranged according to response speeds of various types of memory cards to commands, hence obtaining a most efficient detection way.

Furthermore, the present invention can apply to various kinds of electronic products using memory cards. That is, the above master device 20 can be a personal computer, a notebook computer, a PDA. An electronic dictionary, a digital camera, an MP3 walkman, or an information appliance. The interface connecting the memory card adaptor and the master device be any specification conforming to IDE, ATAPI, SCSI, PCI, PCMCIA, ISA, USB, or their combination.

Additionally, the control device 34 on the memory card adaptor 30 can be a chipset, or can achieve its function using a circuit structure.

To sum up, the present invention relates to a detection method used in a memory card adaptor and, more particularly, to a detection method used in an adaptor capable of inserting various kinds of memory cards, which mainly utilizes differences of response times, signals, and characteristics of various kinds of memory cards to various types of commands and makes appropriate arrangements of detection order to achieve the most efficient detection effect.

Although the present invention has been described with reference to the preferred embodiment thereof, it will be understood that the invention is not limited to the details thereof. Various substitutions and modifications have been suggested in the foregoing description, and other will occur to those of ordinary skill in the art. Therefore, all such substitutions and modifications are intended to be embraced within the scope of the invention as defined in the appended claims.

We claim:

1. A detection method used in an adaptor capable of inserting various kinds of memory cards, comprising mainly the steps of:

(a) providing an adaptor capable of inserting various kinds of memory cards, said adaptor being connected to a master device and having a control device;

(b) said control device issuing an identification command to detect a memory card responsive to said identification command, performing Step (d) if a response is received, performing Step (c) if there is no response;

(c) if there is no response from Step (b), said control device issuing a reset command to detect a reset-type memory card, performing Step (e) if a response that reset action has been finished is received, performing Step (g) if there is no response;

(d) if there is a response from Step (b), said control device entering a read/write mode corresponding to the memory card responsive to said identification command, then performing Step (f);

(e) if there is a response from Step (c), said control device entering a read/write mode corresponding to the reset-type memory card, then performing Step (f);

(f) awaiting a read/write command of said master device; and (g) if there is no response from Step (c), continually awaiting a response signal.

2. The detection method as claimed in claim 1, wherein said memory card responsive to said identification command is a SmartMedia card.

3. The detection method as claimed in claim 1, wherein said reset-type memory card can be a MemoryStick card, a MultiMedia card, or a SecureDigital card.

4. The detection method as claimed in claim 1, wherein said Step (c) can comprise the steps of:
- (c1) said control device issuing a reset command of first type to detect a reset-type memory card of first type, performing said Step (e) if a response that reset action has been finished is received, performing Step (c2) if there is no response; and
- (c2) said control device issuing a reset command of second type to detect a reset-type memory card of second type, performing said Step (e) if a response that reset action has been finished is received, performing said Step (g) if there is no response.

5. The detection method as claimed in claim 4, wherein said memory card responsive to said identification command is a SmartMedia card.

6. The detection method as claimed in claim 4, wherein said reset-type memory card of first type is a MemoryStick card.

7. The detection method as claimed in claim 4, wherein said reset-type memory card of second type can be a MultiMedia card or a SecureDigital card.

8. The detection method as claimed in claim 4, wherein said Step (c2) can comprise the steps of:
- (c21) said control device issuing a reset command of second type to detect a reset-type memory card of second type, performing Step (c22) if a response that reset action has been finished is received, performing said Step (g) if there is no response; and
- (c22) said control device issuing a reset command of third type to detect whether said memory card supports memory card mode of third type, said memory card being a reset-type memory card of third type if the answer is positive; otherwise, said memory card being a reset-type memory card of second type, and then performing said Step(e).

9. The detection method as claimed in claim 8, wherein said reset-type memory card of first type is a MemoryStick card.

10. The detection method as claimed in claim 8, wherein said reset-type memory card of second type is a MultiMedia card.

11. The detection method as claimed in claim 8, wherein said reset-type memory card of third type is a SecureDigital card.

12. The detection method as claimed in claim 1, wherein the interface connecting said adaptor and said master device can be any specification conforming to IDE, ATAPI, SCSI, PCI, PCMCIA, ISA, USB, or their combination.

13. The detection method as claimed in claim 1, wherein said master device can be a personal computer, a notebook computer, a PDA, an electronic dictionary, a digital camera, a digital camcorder, an MP3 walkman, or an information appliance.

14. The detection method as claimed in claim 1, wherein said control device can be a chipset or a circuit structure.

* * * * *